(12) United States Patent
Hsu et al.

(10) Patent No.: US 7,576,933 B2
(45) Date of Patent: Aug. 18, 2009

(54) SYSTEM AND METHOD OF THE OPTICAL DELAY LINE

(75) Inventors: I-Jen Hsu, Taoyuan (TW); Chia-Yun Kao, Taoyuan (TW); Cheng-Chung Lai, Taoyuan (TW); Chao-Ming Chang, Taoyuan (TW); Ti-Kuang Hou, Taoyuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 260 days.

(21) Appl. No.: 11/758,032

(22) Filed: Jun. 5, 2007

(65) Prior Publication Data

US 2008/0304125 A1    Dec. 11, 2008

(51) Int. Cl.
*G02B 5/04* (2006.01)
*G02B 5/08* (2006.01)

(52) U.S. Cl. ............... 359/834; 359/836; 359/861; 359/900

(58) Field of Classification Search ........... 359/834, 359/836, 857, 861, 900
See application file for complete search history.

(56) References Cited

U.S. PATENT DOCUMENTS

| | | | | | |
|---|---|---|---|---|---|
| 2,406,798 | A | * | 9/1946 | Burroughs | 342/429 |
| 3,792,916 | A | * | 2/1974 | Sarna | 359/577 |
| 4,103,991 | A | * | 8/1978 | Kramer | 359/861 |
| 4,170,947 | A | * | 10/1979 | Morgan | 109/16 |
| 4,729,071 | A | * | 3/1988 | Solomon | 362/35 |
| 4,750,809 | A | * | 6/1988 | Kafka et al. | 359/566 |
| 5,146,368 | A | * | 9/1992 | Fink | 359/861 |
| 5,220,463 | A | * | 6/1993 | Edelstein et al. | 359/857 |

* cited by examiner

Primary Examiner—Ricky D Shafer
(74) Attorney, Agent, or Firm—WPAT, P.C.; Justin I. King

(57) ABSTRACT

This invention provides a system and a method of the optical delay line, wherein the system comprises a source and an array of mirrors, wherein the array of mirrors comprises a first reflective mirror, a second reflective mirror, a third reflective mirror, and a fourth reflective mirror. Beams from the source could be delayed because the beams are multi-reflected by the reflective mirrors.

9 Claims, 4 Drawing Sheets

SYSTEM AND METHOD OF THE OPTICAL DELAY LINE

BACKGROUND OF THE INVENTION

1. Field of the Invention

The present invention generally relates to system and method of the optical line, and more particularly to system and method of the optical delay line.

2. Description of the Prior Art

It is very important to delay optical line in many fields of optics, such as microscopy, adaptive optics, crystal optics, holography, optical pattern recognition, photometry, radiometry, thin film optics, physiological optics and so on. However, the traditional system of the optical delay line is always expensive, difficult to fabricate, complicated to operate, and hard to maintain. Hence, we urgently need a new system without the above-mentioned defects for applications of sciences.

Beside, one of the most interested aspects in the development of optical delay line technology is to construct a stable and easy fabricated optical delay line that can perform real-time imaging for clinical applications. There are many methods that have been used for fast scanning in various scientific purposes, for example Optical Coherence Tomography (OCT); measurement of the refractive index, thickness and position of a thin film; measurement of the surface profile of a material; etc. However, most of the configurations are difficult to construct or variational intensity loss exists during the scanning because of the walk-off of different wavelength components and different tilted angle of the scanner.

SUMMARY OF THE INVENTION

Therefore, in accordance with the previous summary, objects, features and advantages of the present disclosure will become apparent to one skilled in the art from the subsequent description and the appended claims taken in conjunction with the accompanying drawings.

This invention provides a system and a method of the optical delay line, wherein the system of the optical delay line has many advantages as compact, simple fabrication, and avoiding the intensity loss during the above-mentioned scanning. The system comprises a source and an array of mirrors, wherein the array of mirrors comprises a first reflective mirror, a second reflective mirror, a third reflective mirror, and a fourth reflective mirror. Beams from the source could be delayed because the beams are multi-reflected by the reflective mirrors.

In addition, the method comprises generating beams from a source; setting a first path by an array of mirrors, wherein the first path connects between a first reflective mirror and a second reflective mirror; setting a second path by the array of mirrors, wherein the second path connects between the second reflective mirror and a third reflective mirror, and the second reflective mirror is perpendicular to the third reflective mirror; setting a third path by the array of mirrors, wherein the third path connects between the third reflective mirror and the first reflective mirror; setting a fourth path by the array of mirrors, wherein the fourth path connects between the first reflective mirror and a fourth reflective mirror, wherein the fourth reflective mirror is inclined positioned at a first angle in order that the beams reflected from the fourth reflective mirror are collinear with incident beams on the fourth reflective mirror; and reflecting the beams by the fourth reflective mirror in order that the beams depart from the array of mirrors via the fourth path, the third path, the second path, and the first path, in turn, after the beams from the source are incident on the fourth reflective mirror via the first path, the second path, the third path, and the fourth path, in turn.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Figure 1A:
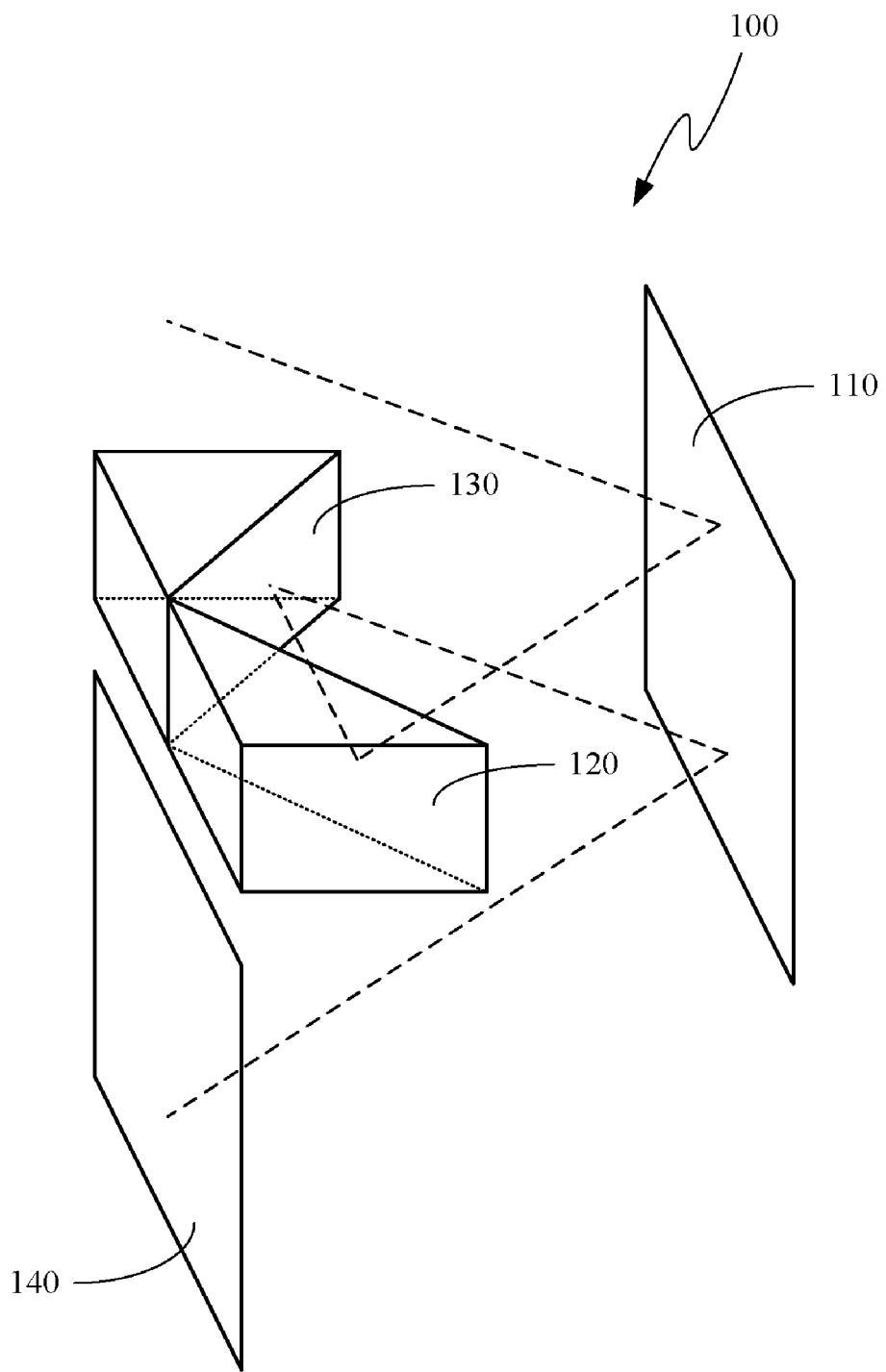
FIG. 1A is a diagram illustrates the structure of the system of optical delay line.

The present disclosure can be described by the embodiments given below. It is understood, however, that the embodiments below are not necessarily limitations to the present disclosure, but are used to a typical implementation of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

Figure 1B:
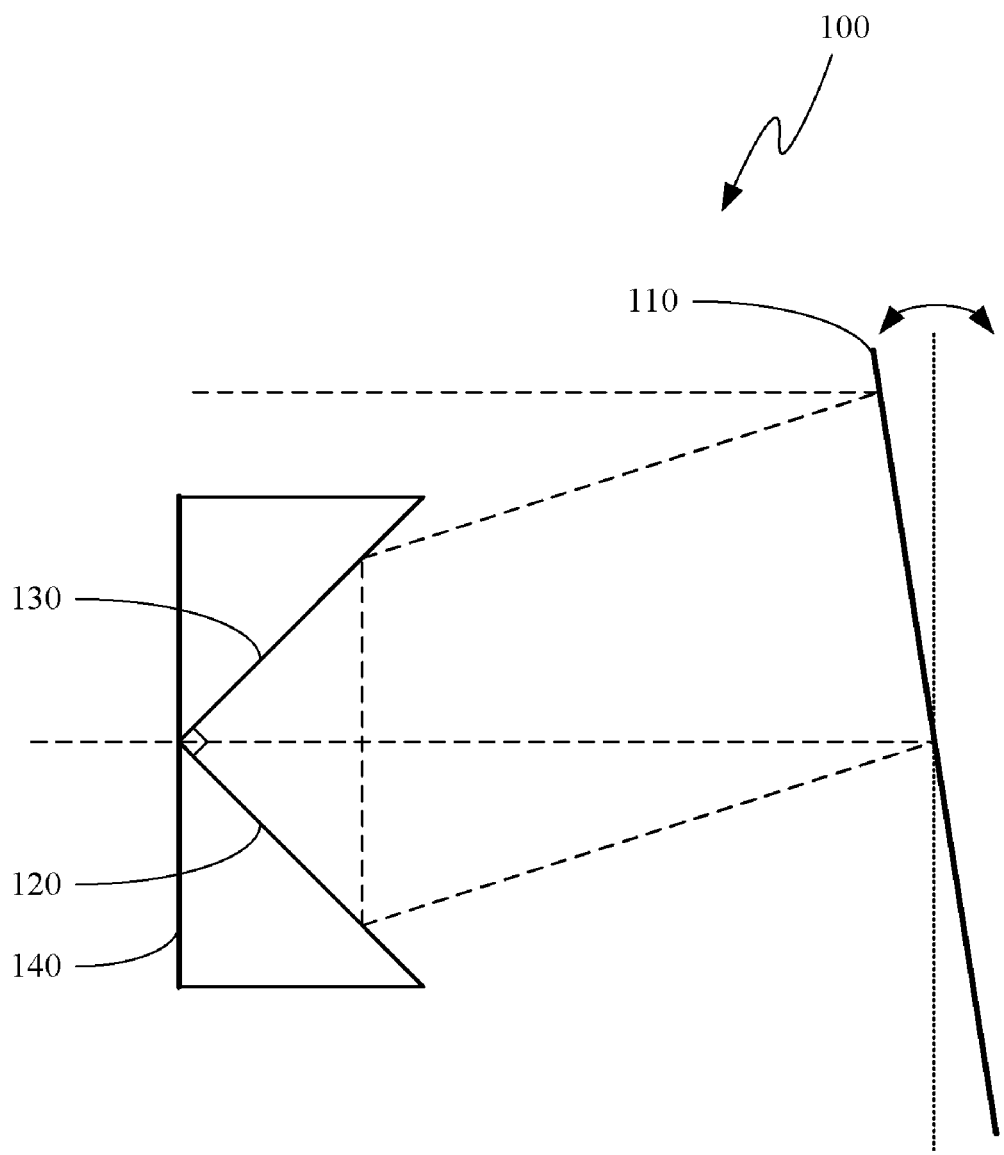
FIG. 1B is a diagram depicts the vertical view of the structure of the system of optical delay line.
Figure 1C:
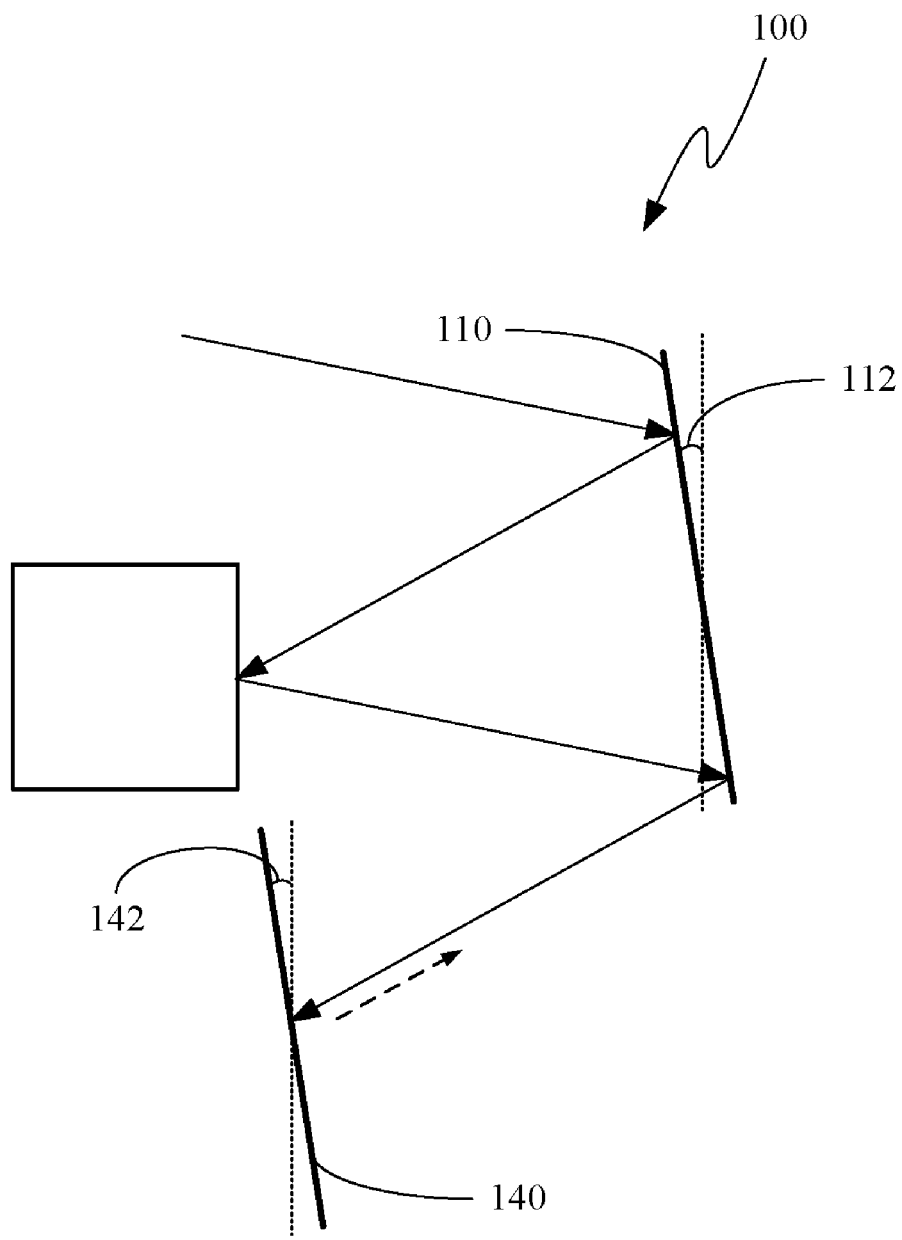
FIG. 1C is a diagram shows the lateral view and profile of the structure of the system of optical delay line.

Please refer to FIG. 1A, FIG. 1B, and FIG. 1C, which are diagrams shows a system of the optical delay line in accordance with an embodiment of the present invention. The system comprises a source and an array of mirrors 100, wherein the source generates beams and the array of mirrors 100 sets a plurality of paths for the beams to pass through, wherein the paths are set by a first reflective mirror 110, a second reflective mirror 120, a third reflective mirror 130, and a fourth reflective mirror 140 of the array of mirrors 100.

The first path connects between the first reflective mirror 110 and the second reflective mirror 120, wherein angles of reflection of the beams reflected by the first reflective mirror 110 are changed by rotating the first reflective mirror 110, as shown in FIG. 1B.

The second path connects between the second reflective mirror 120 and the third reflective mirror 130, wherein the second reflective mirror 120 is perpendicular to the third reflective mirror 130.

The third path connects between the third reflective mirror 130 and the first reflective mirror.

The fourth path connects between the first reflective mirror 110 and the fourth reflective mirror 140, wherein the fourth reflective mirror 140 is inclined positioned at a first angle 142 in order that the beams reflected from the fourth reflective mirror 140 are collinear with incident beams on the fourth reflective mirror 140, as shown in FIG. 1C.

Making a comprehensive survey of the foregoing, the beams from the source are incident on the fourth reflective mirror 140 via the first path, the second path, the third path, and the fourth path, in turn. Then, the beams are reflected by the fourth reflective mirror 140 and depart from the array of mirrors 100 via the fourth path, the third path, the second path, and the first path, in turn. Angles of reflection of the beams reflected by the first reflective mirror 110 are changed by rotating the first reflective mirror 110; and the length of the first path, the second path, the third path, and the fourth path could be changed because of the variation of the angles of reflection. Therefore, the beams could be delayed due to the variation of the length of the paths.

Please refer to FIG. 1B, the beams form the source are incident oblique on the first reflective mirror 110 by inclined positioning the first reflective mirror 110 at a second angle 112, and consequently passes through the first path, the second path, the third path, and the fourth path. Furthermore, the beams reflected from the fourth reflective mirror 140 must be collinear with incident beams on the fourth reflective mirror 140 because the fourth reflective mirror 140 are inclined positioned at the first angle 142 by rotating the fourth reflective mirror 140.

Figure 1D:
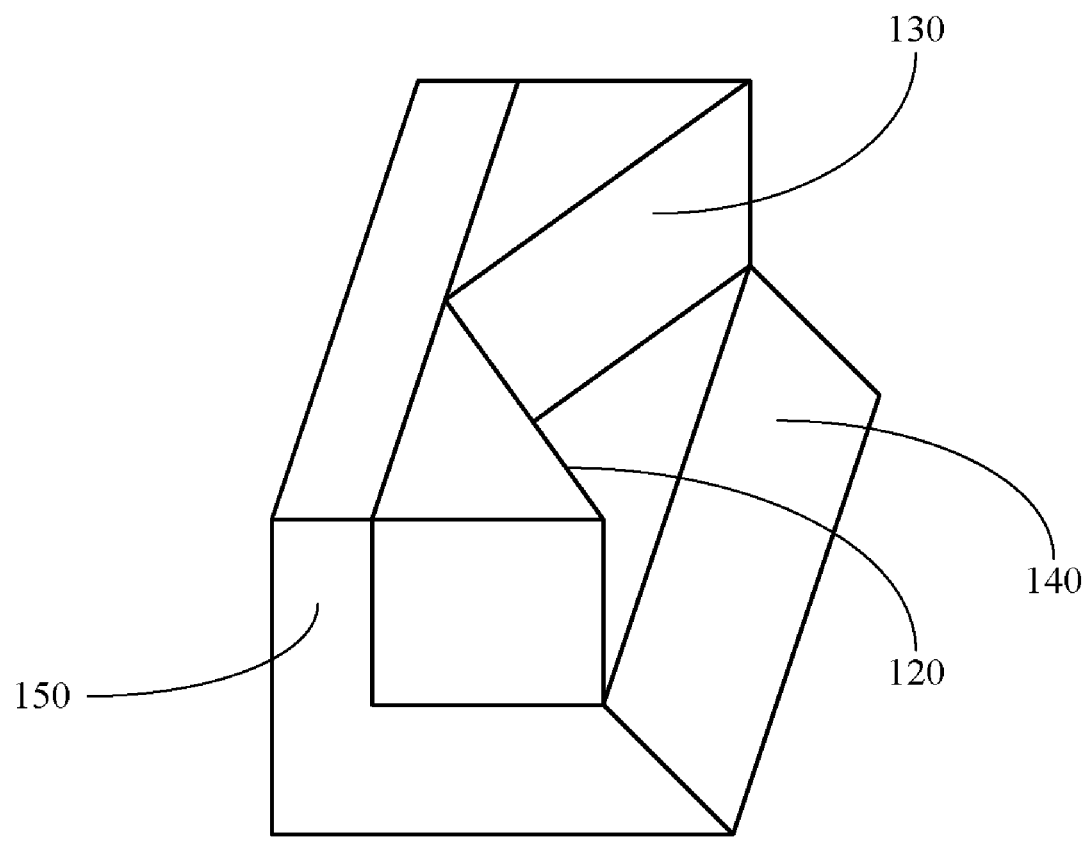
FIG. 1D is a diagram displays the stage of the system of optical delay line

It is more convenient for operations of the system that the second reflective mirror 120, the third reflective mirror 130, and the fourth reflective mirror 140 are configured on a stage 150, as shown in FIG. 1D.

According to the foregoing description, the present invention further discloses a method of the optical delay line, wherein the method comprises generating beams from a source; setting a first path by an array of mirrors 110, wherein the first path connects between a first reflective mirror 110 and a second reflective mirror 120; setting a second path by the array of mirrors 100, wherein the second path connects between the second reflective mirror 120 and a third reflective mirror 130, and the second reflective mirror 120 is perpendicular to the third reflective mirror 130; setting a third path by the array of mirrors 100, wherein the third path connects between the third reflective mirror 130 and the first reflective mirror 110; setting a fourth path by the array of mirrors 100, wherein the fourth path connects between the first reflective mirror 110 and a fourth reflective mirror 140, wherein the fourth reflective mirror 140 is inclined positioned at a first angle 142 in order that the beams reflected from the fourth reflective mirror 140 are collinear with incident beams on the fourth reflective mirror 140; and reflecting the beams by the fourth reflective mirror 140 in order that the beams depart from the array of mirrors 100 via the fourth path, the third path, the second path, and the first path, in turn, after the beams from the source are incident on the fourth reflective mirror 140 via the first path, the second path, the third path, and the fourth path, in turn.

Then, angles of reflection of the beams reflected by the first reflective mirror 110 are changed by rotating the first reflective mirror 110; and the length of the first path, the second path, the third path, and the fourth path could be changed because of the variation of the angles of reflection. Therefore, the beams could be delayed due to the variation of the length of the paths.

The beams form the source are incident oblique on the first reflective mirror 110 by inclined positioning the first reflective mirror 110 at a second angle 112, and consequently passes through the first path, the second path, the third path, and the fourth path.

As above, the fourth reflective mirror 140 is also inclined positioned at the first angle 142 by rotating the fourth reflective mirror 140, and the second reflective mirror 120, the third reflective mirror 130, and the fourth reflective mirror 140 could be configured on a stage 150.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A system of an optical delay line, comprising:
   a source, generating beams; and
   an array of mirrors, comprising a first reflective mirror, a second reflective mirror, a third reflective mirror, and a fourth reflective mirror, wherein said array of mirrors sets a plurality of paths for said beams to pass through, wherein said paths comprise:
      a first path, connecting between said first reflective mirror and said second reflective mirror, wherein angles of reflection of said beams reflected by said first reflective mirror are changed by rotating said first reflective mirror;
      a second path, connecting between said second reflective mirror and said third reflective mirror, wherein said second reflective mirror is perpendicular to said third reflective mirror;
      a third path, connecting between said third reflective mirror and said first reflective mirror; and
      a fourth path, connecting between said first reflective mirror and said fourth reflective mirror, wherein said fourth reflective mirror is inclined positioned at a first angle in order that said beams reflected from said fourth reflective mirror are collinear with incident beams on said fourth reflective mirror;
   wherein said beams from said source are incident on said fourth reflective mirror via said first path, said second path, said third path, and said fourth path, in turn, and reflected by said fourth reflective mirror to depart from said array of mirrors via said fourth path, said third path, said second path, and said first path, in turn.

2. A system of the optical delay line of claim 1, wherein said beams form said source are incident oblique on said first reflective mirror by inclined positioning said first reflective mirror at a second angle.

3. A system of the optical delay line of claim 1, wherein said fourth reflective mirror is rotated to be inclined positioned at said first angle.

4. A system of the optical delay line of claim 1, wherein said second reflective mirror, said third reflective mirror, and said fourth reflective mirror are configured on a stage.

5. A method of an optical delay line, comprising the steps of:
generating beams from a source;
setting a first path by an array of mirrors, wherein said first path connects between a first reflective mirror and a second reflective mirror;
setting a second path by said array of mirrors, wherein said second path connects between said second reflective mirror and a third reflective mirror, and said second reflective mirror is perpendicular to said third reflective mirror;
setting a third path by said array of mirrors, wherein said third path connects between said third reflective mirror and said first reflective mirror;
setting a fourth path by said array of mirrors, wherein said fourth path connects between said first reflective mirror and a fourth reflective mirror, wherein said fourth reflective mirror is inclined positioned at a first angle in order that said beams reflected from said fourth reflective mirror are collinear with incident beams on said fourth reflective mirror; and
reflecting said beams by said fourth reflective mirror in order that said beams depart from said array of mirrors via said fourth path, said third path, said second path, and said first path, in turn, after said beams from said source are incident on said fourth reflective mirror via said first path, said second path, said third path, and said fourth path, in turn.

6. A method of the optical delay line of claim 5, wherein said beams form said source are incident oblique on said first reflective mirror by inclined positioning said first reflective mirror at a second angle.

7. A method of the optical delay line of claim 5, further comprising the steps of:
rotating said first reflective mirror to change angles of reflection of said beams reflected by said first reflective mirror.

8. A method of the optical delay line of claim 5, wherein said fourth reflective mirror is rotated to be inclined positioned at said first angle.

9. A method of the optical delay line of claim 5, wherein said second reflective mirror, said third reflective mirror, and said fourth reflective mirror are configured on a stage.

* * * * *